United States Patent [19]

Rouèche

[11] 4,053,464
[45] Oct. 11, 1977

[54] DISAZO PIGMENTS CONTAINING ETHER SUBSTITUTED ALKOXY CARBONYL GROUPS

[75] Inventor: Armand Rouèche, Bottmingen, Switzerland

[73] Assignee: Ciba-Geigy Corporation, Ardsley, N.Y.

[21] Appl. No.: 479,732

[22] Filed: June 17, 1974

[30] Foreign Application Priority Data

June 26, 1973 Switzerland .................. 9326/73

[51] Int. Cl.² .................. C09B 33/14; C09B 43/12
[52] U.S. Cl. .................. 260/174; 260/184
[58] Field of Search .............. 260/174, 177, 184, 187, 260/188

[56] References Cited

U.S. PATENT DOCUMENTS

| 2,774,755 | 12/1956 | Schmid et al. | 260/174 |
| 2,888,453 | 5/1959 | Schmid et al. | 260/174 |
| 3,562,249 | 2/1971 | Schnabel et al. | 260/184 |
| 3,691,149 | 9/1972 | Mueller et al. | 260/174 |

FOREIGN PATENT DOCUMENTS

| 1,644,111 | 10/1970 | Germany | 260/174 |
| 477,521 | 10/1969 | Switzerland | 260/174 |

OTHER PUBLICATIONS

Lubs, The Chemistry of Synthetic Dyes & Pigments, Reinhold Publishing Corp: New York, 1955, pp. 670–671.

Primary Examiner—Charles F. Warren
Attorney, Agent, or Firm—Vincent J. Cavalieri

[57] ABSTRACT

New disazo pigments of the formula

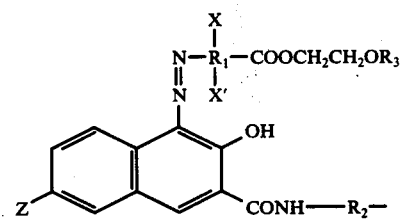

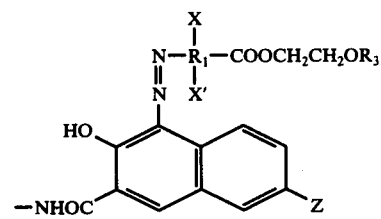

wherein $R_1$ denotes a benzene radical, $R_2$ denotes an aromatic radical, X and X' denote hydrogen or chlorine atoms, alkyl or alkoxy groups containing 1-6 carbon atoms, or aryloxy groups, $R_3$ denotes an alkyl group containing 1-6 carbon atoms, or an aryl radical, and Z denotes a hydrogen or halogen atom, an alkoxy group containing 1-4 carbon atoms, or a nitro or nitrile group which are useful for pigmenting high molecular organic material.

1 Claim, No Drawings

DISAZO PIGMENTS CONTAINING ETHER SUBSTITUTED ALKOXY CARBONYL GROUPS

It has been found that new, valuable disazo pigments of the formula

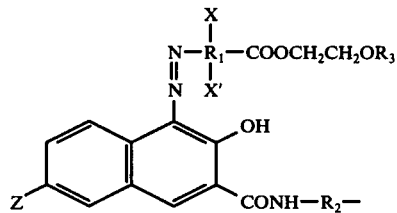
(I)

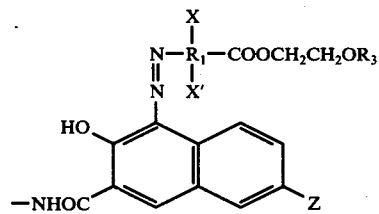

wherein $R_1$ denotes a benzene radical, $R_2$ denotes an aromatic radical, X and X' denote hydrogen or chlorine atoms, alkyl or alkoxy groups containing 1–6 carbon atoms, or aryloxy groups which are optionally substituted, for example by halogen atoms or alkyl or alkoxy groups containing 1–6 carbon atoms, $R_3$ denotes an alkyl group containing 1–6 carbon atoms, or an aryl radical, for example a benzene radical which is optionally substituted by chlorine atoms or methyl or methoxy groups, and Z denotes a hydrogen or halogen atom, an alkoxy group containing 1–6 carbon atoms, or a nitro or nitrile group, are obtained if a. a carboxylic acid halide of the formula

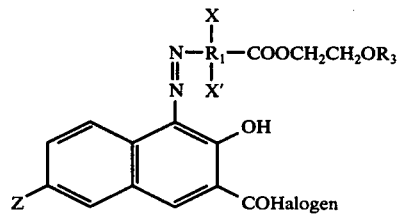
(II)

is condensed in the molar ratio 2:1 with an aromatic diamine, or b) a diazo or diazoamino compound of an amine of the formula

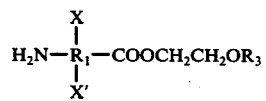
(III)

is coupled in the molar ratio 2:1 with a 2,3-hydroxynaphthoic acid arylide of the formula

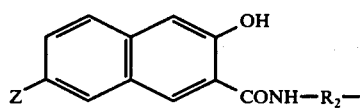
(IV)

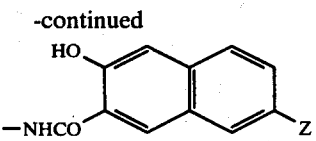

Since the dyestuffs according to the invention are pigments, groups conferring water-solubility, particularly acid groups conferring water-solubility, such as sulphonic acid or carboxylic acid groups, are naturally excluded.

Disazo pigments of particular interest are those of the formula

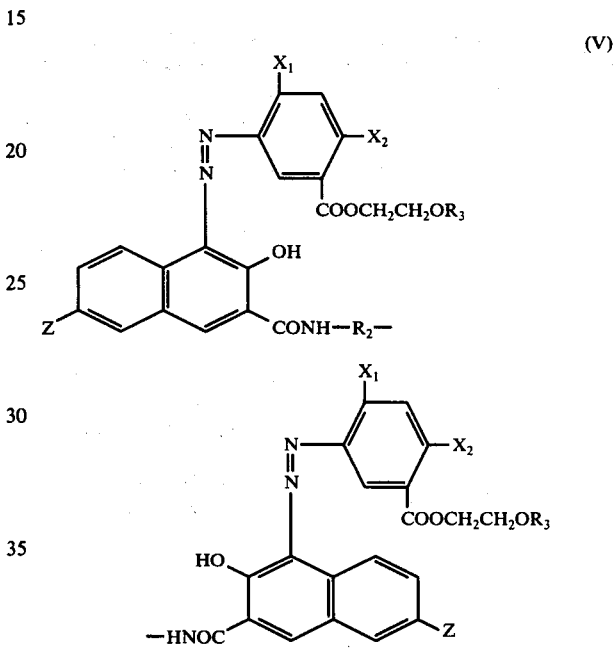
(V)

wherein $R_2$, $R_3$ and Z have the meaning indicated above and $X_1$ and $X_2$ denote hydrogen or chlorine atoms or alkyl or alkoxy groups containing 1–6 carbon atoms, or those of the formula

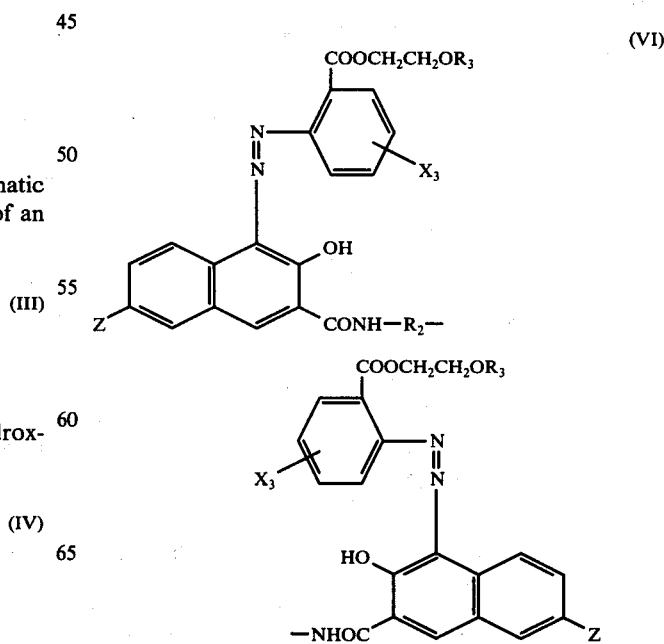
(VI)

wherein $R_2$, $R_3$ and Z have the meaning indicated above and $X_3$ denotes a hydrogen or chlorine atom or a methyl group.

In the formulae (V) and (VI), $R_2$ preferably represents a phenylene radical, particularly a phenylene radical of the formula

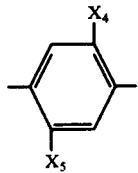 (VII)

wherein $X_4$ and $X_5$ denote hydrogen or halogen atoms, alkyl or alkoxy groups containing 1 – 6 carbon atoms, or nitrile or trifluoromethyl groups.

The azo dyestuff carboxylic acid on which the acid halides to be used in accordance with the invention are based, are obtained by coupling a dizotised amine of the formula

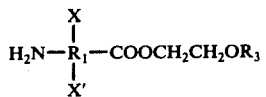 (VIII)

wherein $R_1$, $R_3$, X and X' have the meaning indicated, with 2,3-hydroxynaphthoic acid or one of its derivatives which is substituted in the 6-position by a halogen atom or a nitro, nitrile or alkoxy group.

The amines of the formula VIII can be obtained by known processes by condensing a nitrobenzenecarboxylic acid chloride of the formula

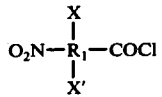

with an ethylene glycol half-ether of the formula $HOCH_2CH_2OR_3$ and reducing the resulting nitrobenzenecarboxylic acid ester, preferably by a catalytic means.

Amines of particular interest as diazo components are those of the formula

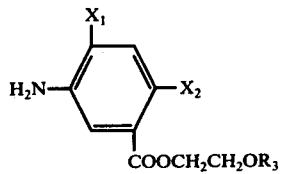 (IX)

or of the formula

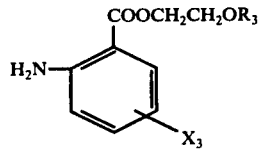 (X)

$X_1$, $X_2$, $X_3$ and $R_3$ in the formulae (IX) and (X) having the meaning indicated.

The following examples of amines of the formula (VIII) may be mentioned: 1-Amino-2-chloro-5-carboxylic acid β-ethoxyethyl ester, 1-amino-2-chloro-5-carboxylic acid β-methoxyethyl ester, 1-amino-2-chloro-5-carboxylic acid β-propoxyethyl ester, 1-amino-2-chloro-5-carboxylic acid β-isopropoxyethyl ester, 1-amino-2-chloro-5-carboxylic acid β-butoxyethyl ester, 1-amino-2-chloro-5-carboxylic acid β-allyloxyethyl ester, 1-amino-2-chloro-5-carboxylic acid β-hexyloxyethyl ester, 1-amino-2-chloro-5-carboxylic acid β-phenoxyethyl ester, 1-amino-2,4-dichloro-5-carboxylic acid β-methoxyethyl ester, 1-amino-2,4-dichloro-5-carboxylic acid β-ethoxyethyl ester, 1-amino-2,4-dichloro-5-carboxylic acid β-isopropoxyethyl ester, 1-amino-2,4-dichloro-5-carboxylic acid β-phenoxyethyl ester, 1-amino-2,4-dichloro-5-carboxylic acid β-hexyloxyethyl ester, 1-amino-2,4-dichloro-5-carboxylic acid β-propoxyethyl ester, 1-amino-2,4-dichloro-5-carboxylic acid β-allyloxyethyl ester, 1-amino-3-carboxylic acid β-methoxyethyl ester, 1-amino-3-carboxylic acid β-ethoxyethyl ester, 1-amino-3-carboxylic acid β-phenoxyethyl ester, 1-amino-4-chloro-5-carboxylic acid β-ethoxyethyl ester, 1-amino-3-chloro-4-carboxylic acid β-methoxyethyl ester, 1-amino-3-chloro-6-carboxylic acid β-ethoxyethyl ester, 1-amino-4-chloro-6-carboxylic acid β-ethoxyethyl ester, 1-amino-4-carboxylic acid β-ethoxyethyl ester, 1-amino-4-carboxylic acid β-phenoxyethyl ester, 1-amino-2-methoxy-5-carboxylic acid β-methoxyethyl ester, 1-amino-2-methoxy-5-carboxylic acid β-ethoxyethyl ester, 1-amino-2-methoxy-5-carboxylic acid β-phenoxyethyl ester, 1-amino-2-carboxylic acid β-methoxyethyl ester, 1-amino-2-carboxylic acid β-ethoxyethyl ester, 1-amino-2-carboxylic acid β-phenoxyethyl ester, 1-amino-2-carboxylic acid β-4'-chlorophenoxyethyl ester, 1-amino-2-carboxylic acid β-4'-methylphenoxyethyl ester, 1-amino-2-carboxylic acid β-4'-methoxyphenoxyethyl ester, 1-amino-2-carboxylic acid β-2'-chlorophenoxyethyl ester, 1-amino-2-carboxylic acid β-2'-methylphenoxyethyl ester, 1-amino-2-carboxylic acid 5-chloro-β-phenoxyethyl ester, 1-amino-2-carboxylic acid 5-chloro-β-ethoxyethyl ester, 1-amino-2-methyl-5-carboxylic acid β-ethoxyethyl ester, 1-amino-2-methyl-5-carboxylic acid β-methoxyethyl ester, 1-amino-2-methyl-5-carboxylic acid β-isopropoxyethyl ester, 1-amino-2-methyl-5-carboxylic acid β-phenoxyethyl ester, 1-amino-2-methyl-4-carboxylic acid β-methoxyethyl ester, 1-amino-2-methyl-4-carboxylic acid β-ethoxyethyl ester, 1-amino-2-methyl-4-carboxylic acid β-phenoxyethyl ester, 1-amino-4-methyl-2-carboxylic acid β-phenoxyethyl ester and 1-amino-4-methyl-2-carboxylic acid β-ethoxyethyl ester.

The azo dyestuff carboxylic acids thus obtained are treated with agents capable of converting carboxylic acids into their halides, for example the chlorides or bromides, that is to say especially with phosphorus halides, such as phosphorus pentachloride or phosphorus trichloride or pentabromide, phosphorus oxyhalides and, preferably, with thionyl chloride.

The treatment with such agents which produce acid halides is suitably carried out in inert organic solvents, such as dimethylformamide, chlorobenzenes, for example monochlorobenzene or dichlorobenzene, toluene, xylene or nitrobenzene, with the optional addition of dimethylformamide in the case of the last 5 mentioned.

In the preparation of the carboxylic acid halides, it is advisable, as a rule, first of all to dry the azo compounds which have been prepared in an aqueous medium or to free them from water azeotropically by heating in an organic solvent. If desired, the azeotropic drying can be carried out immediately before the treatment with the agents which produce acid halides.

Azo dyestuff carboxylic acid chlorides of particular interest as starting materials are those of the formula

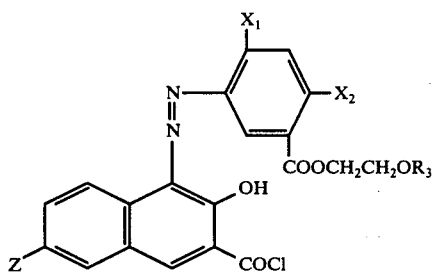

wherein $R_3$ and Z have the meaning indicated, and $X_1$ and $X_2$ denote hydrogen or chlorine atoms, or alkyl or alkoxy groups containing 1 – 6 carbon atoms, or those of the formula

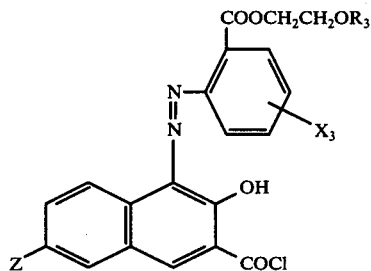

wherein $R_3$ and Z have the meaning indicated and $X_3$ denotes a hydrogen or chlorine atom or a methyl group.

In accordance with the present process, the monocarboxylic acid halides of the formula II are condensed in the molar ratio 2:1 with arylenediamines, preferably with phenylenediamines or diaminodiphenylene. Use is preferably made of 1,4-diaminobenzenes of the formula

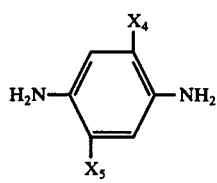

wherein $X_4$ and $X_5$ denote hydrogen or halogen atoms, alkyl or alkoxy groups containing 1-6 C atoms, or nitrile, trifluoromethyl groups.

Very good dyestuffs are also achieved with amines of the diphenyl series, particularly those of the formula

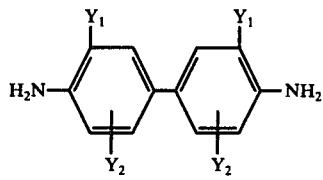

wherein the $Y_1$ and $Y_2$ denote hydrogen or halogen atoms, alkyl or alkoxy groups containing 1-6 C atoms, or alkoxycarbonyl groups containing 2-6 C atoms. The following amines may be mentioned as examples: 1,4-Diaminobenzene, 1,4-diamino-2-chlorobenzene, 1,4-diamino-2-bromobenzene, 1,4-diamino-2,5-dichlorobenzene, 1,4-diamino-2-methylbenzene, 1,4-diamino-2,5-dimethylbenzene, 1,4-diamino-2-methoxybenzene, 1,4-diamino-2,5-dimethoxybenzene, 1,4-diamino-2,5-diethoxybenzene, 2-cyano-1,4-phenylenediamine, 2-trifluoromethyl-1,4-phenylenediamine, 2-chloro-5-methyl-1,4-phenylenediamine, 2-chloro-5-methoxy-1,4-phenylenediamine, 2-methyl-5-methoxy-1,4-phenylenediamine, 4,4'-diaminodiphenyl, 3,3'-dichloro-4,4'-diaminodiphenyl, 3,3'-dimethyl-4,4'-diaminodiphenyl, 3,3'-dimethoxy-4,4'-diaminodiphenyl, 2,2'-dimethoxy-5,5'-dichloro-4,4'-diaminodiphenyl, 3,3',5,5'-tetrachloro-4,4'-diaminodiphenyl, 2,2',5,5'-tetrachloro-4,4'-diaminodiphenyl, 3,3'-dichloro-5,5'-dimethyl-4,4'-diaminodiphenyl, 2,2'-dichloro-5,5'-dimethyl-4,4'-diaminodiphenyl, 4,4'-diamino-diphenyl-3,3'-dicarboxylic acid dimethyl ester, 2-methylsulphone-1,4-diaminobenzene, 1,3-diaminobenzene, 1,3-diamino-4-chlorobenzene, 1,3-diamino-4-methylbenzene, 1,3-diamino-4,6-dichlorobenzene, 2-(4'-methylphenyl sulphone)-1,4-diaminobenzene, 1,5-diamino-naphthalene, 1,4-diamino-naphthalene, 4,4'-diamino-diphenyl ether, 4,4'-diamino-diphenyl ketone, 4,4'-diamino-diphenyl sulphone, 3,3'-diamino-4,4'-dimethyl-diphenyl sulphone, 4,4'-diaminodiphenylmethane, 4,4'-diamino-3,3'-dimethyldiphenylmethane, 4,4'-diamino-diphenylsulphide, 4,4'-diamino-diphenylurea, 4,4'-diamino-diphenylstilbene, 2,7-diamino-diphenylene-oxide, 2,7-diamino-fluorene, 2,7-diamino-fluorenone, 2,7-diamino-carbazole, 3,6-diamino-carbazole and 1,4-diamino-2-carbomethoxybenzene.

The condensation between the carboxylic acid halides of the kind mentioned initially and the amines is appropriately carried out in an anhydrous medium. Under these conditions, it generally takes place surprisingly easily even at temperatures within the boiling range of normal organic solvents, such as toluene, monochlorobenzene, dichlorobenzene, trichlorobenzene, nitrobenzene and the like. In order to accelerate the reaction, it is generally advisable to use an acid-binding agent, such as anhydrous sodium acetate or pyridine. The resulting dyestuffs are partly crystalline and partly amorphous and are obtained for the most part in very good yield and in a pure condition. It is advisable, first of all to separate the acid chlorides obtained from the carboxylic acids. In some cases, however, separation of the acid chlorides can be dispensed with without harm and the condensation can be carried out directly after the preparation of the carboxylic acid chlorides.

According to a modified embodiment of the process according to the invention, the new dyestuffs are obtained if a diazo or diazoamino compound of an amine of the formula III is coupled in the molar ratio 2:1 with a 2,3-hydroxynaphthoic acid arylide of the formula IV.

The 2,3-hydroxynaphthoic acid arylides required for this purpose can be prepared by a method which is in itself known from a 2,3-hydroxynaphthoic acid which is optionally substituted in the 6-position, and an arylenediamine in an anhydrous medium, such as toluene, xylene, chlorobenzene and the like, under the influence of a condensation agent, such as phosphorus trichloride.

The coupling is carried out by gradually adding the aqueous-alkaline solution of the coupling component to the acid solution of the diazonium salt. The quantity of alkali metal hydroxide to be used for the solution of the coupling component is appropriately regulated so that it suffices for the neutralization of the mineral acid liberated from the diazonium salt in the coupling. The coupling is suitably carried out at a $p_H$ value of 4 to 6. The $p_H$ value is advantageously adjusted by the addition of a buffer. Examples of suitable buffers are the salts, especially the alkali metal salts, of formic acid, phosphoric acid or, particularly, acetic acid. The alkaline solution of the coupling component appropriately contains a wetting agent, dispersing agent or emulsifier, for example an aralkyl-sulphonate, such as dodecylbenzenesulphonate or the sodium salt of 1,1'-naphthylmethanesulphonic acid, polycondensation products of alkylene oxides, such as the product resulting from the addition of ethylene oxide to p-tert.-octylphenyl, and also alkyl esters of sulphoricinoleates, for example n-butyl sulphoricinoleate. The dispersion of the coupling component can also advantageously contain protective colloids, for example methylcellulose or minor amounts of inert organic solvents which are sparingly soluble or insoluble in water, for example optionally halogenated or nitrated aromatic hydrocarbons, such as benzene, toluene, xylene, chlorobenzene, dichlorobenzenes or nitrobenzene, and aliphatic halogenated hydrocarbons, such as, for example, carbon tetrachloride or trichloroethylene, and also water-miscible organic solvents, such as acetone, ethylene glycol monomethyl ether, methyl ethyl ketone, methanol, ethanol or isopropanol.

The coupling can also be advantageously carried out by combining an acid solution of the diazonium salt with an alkaline solution of the coupling component continuously in a mixing jet, in which an immediate coupling of the components takes place. Care must be taken that the diazo component and the coupling component are present in the mixing jet in equimolecular amounts, a slight excess of coupling component being found advantageous. This is effected most simply by controlling the $p_H$ value of the liquid in the mixing jet. A vigorous turbulence of the two solutions in the mixing jet must also be ensured. The resulting dyestuff dispersion is withdrawn continuously from the mixing jet and the dyestuff is separated by filtration.

It is also possible to carry out the coupling by heating a diazoamino compound of the amine of the formula III with a naphthol of the formula IV in an organic solvent, if appropriate in an aqueous-organic solvent, preferably in the presence of an acid.

The aryldiazoamides to be used in accordance with the process are obtained by a known process by condensing an aryldiazonium salt with a primary, or preferably with a secondary, amine. The most diverse amines are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid and β-aminoethylsulphuric acid, alicyclic amines, such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2,4-disulphonic acid, heterocyclic amines, such as piperidine, morpholine, pyrrolidine and dihydroindole, and, finally, also sodium cyanamide or dicyandiamide.

As a rule the resulting diazoamino compounds are sparingly soluble in cold water and can, if appropriate, be separated from the reaction medium in a crystalline form, after salting out. In many cases the moist press cakes can be used for further reaction. In particular cases it can prove advisable to free the diazoamides from water, prior to the reaction, by vacuum drying or to remove the water by azeotropic distillation after suspending the moist press cake in a solvent.

The coupling of the diazoamino compound with the naphthol is carried out in an organic solvent, for example chlorobenzene, o-dichlorobenzene, nitrobenzene, pyridine, ethylene glycol, ethylene glycol monomethyl ether or monoethyl ether, dimethylformamide, formic acid or acetic acid. If solvents which are miscible with water are used, it is not necessary to use the diazoamino compounds in an anhydrous form. The filter cake, moist with water, can be used, for example. The splitting of the diazoamino compound, which precedes the coupling, is carried out in an acid medium. If neutral solvents are used, the addition of an acid, for example hydrochloric acid, sulphuric acid, formic acid or acetic acid, is necessary.

The coupling is appropriately carried out hot, preferably at temperatures between 80° and 180° C, and it generally takes place very rapidly and completely.

By virtue of their insolubility, the resulting pigments can be isolated from the reaction mixtures by filtration. Since the by-products remain in solution, the resulting pigments are obtained in an outstanding state of purity. An after-treatment with organic solvents is advisable in the case of pigments obtained by the aqueous coupling route. A further advantage of the process according to the invention is the high yield, the advantageous form from the point of view of pigment technology and the constancy of the properties of the pigments obtained.

By virtue of their advantageous properties, the pigments which can be obtained in accordance with the process can be used for the most diverse pigment applications, for example in a finely divided form for dyeing artificial silk and viscose or cellulose ethers and cellulose esters or dyeing high molecular polyamides or high molecular polyurethanes or polyesters in the spinning composition, and for the manufacture of colored lacquers or lake formers, solutions or products composed of acetylcellulose, nitrocellulose, natural resins or synthetic resins, such as polymerization resins or condensation resins, for example aminoplasts, alkyd resins and phenoplasts, polyolefines, such as polystyrene, polyvinyl chloride, polyethylene, polypropylene, polyacrylonitrile, rubber, casein, silicone and silicone resins. In addition, they can be used with advantage in the manufacture of printing inks, colored pencils, cosmetic preparations or laminated plates.

The resulting dyestuffs are distinguished by outstanding fastness properties, particularly fastness to weathering, light, migration and over-varnishing, and, moreover, by good heat stability. Compared with the corresponding ethyl esters, the present new products, which contain an alkyloxyethyl ester group, and particularly an aryloxyethyl ester group in the diazo component, are distinguished by better heat stability in polyamide, polyester and polypropylene.

In the following examples, unless otherwise stated, the parts denote parts by weight and the percentages denote percentages by weight.

EXAMPLE 1

23 parts of the dry monoazo dyestuff carboxylic acid, obtained by acetic acid coupling of diazotised anthranilic acid β-phenoxyethyl ester and 2,3-hydroxynaphthoic acid, are heated to 55°–60° C for 10 hours in 120 parts of benzene, 4 parts of dimethylformamide and 9.8 parts of thionyl chloride.

The mixture is then allowed to cool and the uniformly crystalline dyestuff carboxylic acid chloride is filtered off, rinsed with a little benzene and dried in vacuo at 30° to 40° C. 21.6 parts (91% of theory) are obtained.

20 parts of this dyestuff carboxylic acid chloride, together with 3.55 parts of 2,5-dichloro 1,4-phenylenediamine and 3.2 parts of pyridine, are heated in 500 parts of o-dichlorobenzene at 140° to 145° C for 12 hours. The pigment formed is then filtered off at 90° C and washed with hot o-dichlorobenzene, then with methanol and finally with water. After drying in vacuo at 80° to 90° C, 18.0 parts of a soft-grained, red pigment are obtained. The pigment corresponds to the formula

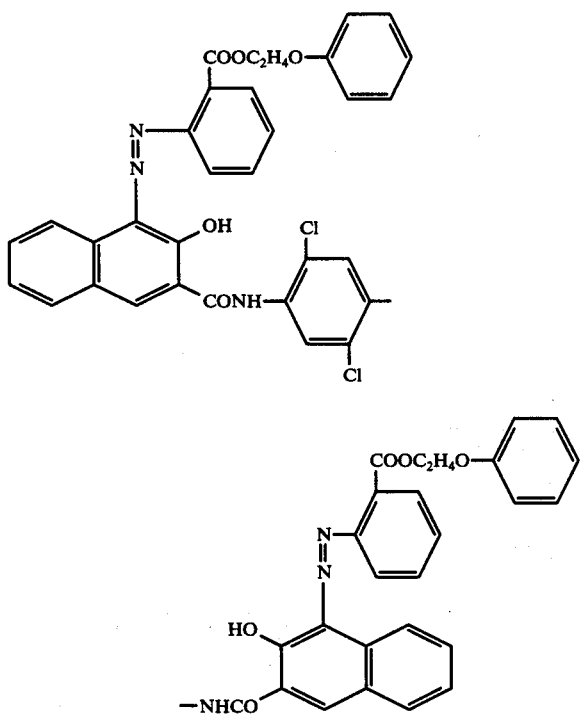

and it colors plastics, such as polyvinyl chloride, and lacquers in brilliant, red color shades of excellent fastness to migration, over-varnishing and light.

EXAMPLE 2

22 parts of the dry monoazo dyestuff carboxylic acid, obtained by acetic acid coupling or diazotised 3-amino-4-methoxybenzoic acid β-methoxyethyl ester and 2,3-hydroxynaphthoic acid, are heated at 55° to 60° C for 10 hours in 350 parts of benzene, 4 parts of dimethylformamide and 9.8 parts of thionyl chloride.

The mixture is then allowed to cool and the uniformly crystalline dyestuff carboxylic acid chloride is filtered off, rinsed with a little benzene and dried in vacuo at 40° to 50° C. 20.6 parts (92% of theory) of the dyestuff carboxylic acid chloride are obtained.

2.3 parts of this dyestuff carboxylic acid chloride, together with 0.35 part of 2,5-dimethyl-1,4-phenylenediamine, are heated at 140° to 145° C for 12 hours in 100 parts of o-dichlorobenzene. The pigment formed is then filtered off at 90° C and washed with hot o-dichlorobenzene, then with methanol and finally with water. After drying in vacuo at 80° to 90° C, 1.8 parts of a soft-grained, red pigment are obtained. The pigment corresponds to the formula

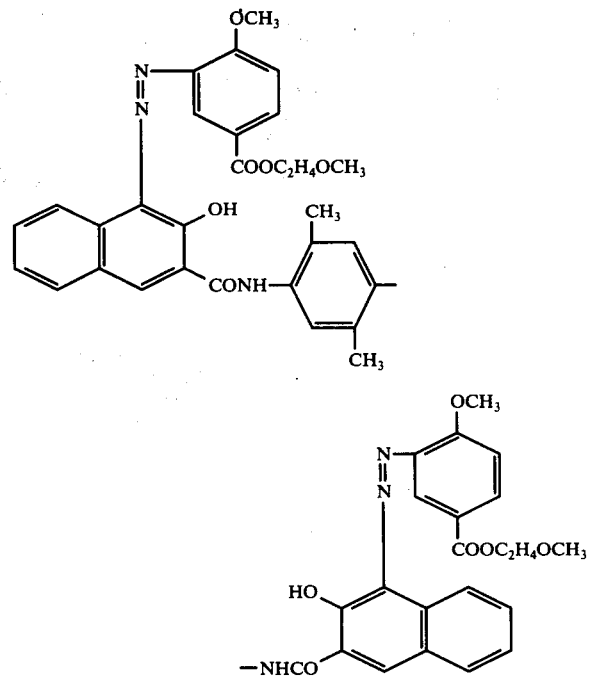

and it colors plastics, such as polyvinyl chloride, and lacquers in brilliant, bluish-tinged red color shades of excellent fastness to migration, over-varnishing and light.

EXAMPLE 3

21.5 parts of the monoazo dyestuff obtained by coupling diazotised 4-chloro-3-aminobenzoic acid β-methoxyethyl ester onto 2,3-hydroxynaphthoic acid, are stirred in 150 parts of chlorobenzene containing 3.5 parts of dimethylformamide.

9.0 parts of thionyl chloride are then added dropwise at 40°–45° C and the mixture is then warmed to 55°–60° C over the course of 10 hours. It is then allowed to cool and the precipitated azo dyestuff carboxylic acid chloride is filtered off, the filter residue being washed successively with benzene and petroleum ether and dried in vacuo at 40°–50° C. 17.0 parts of the azo dyestuff carboxylic acid chloride are obtained.

1.9 parts of the acid chloride thus prepared are stirred with 50 parts of o-dichlorobenzene and a solution of 0.29 part of 2-chloro-1,4-phenylenediamine in 60 parts of o-dichlorobenzene and 0.2 part of pyridine is added at 60° C. The mixture is heated with stirring for 8 hours at 140°–145° C. The uniformly crystalline pigment is filtered off with suction at 100° C and washed with hot o-dichlorobenzene, then with methanol and then with water. After drying in vacuo at 90°–100° C, 1.7 parts of a soft-grained red pigment are obtained, which colors plastics, such as polyvinyl chloride, and lacquers in brilliant red color shades of excellent fastness to migration, over-varnishing and light. The new organic pigment has the following structural formula:

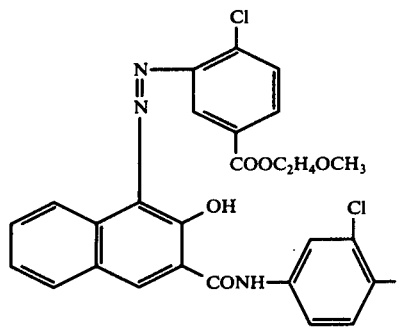

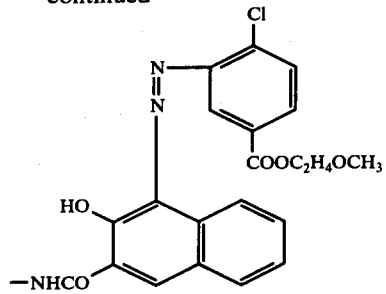

The table which follows describes further acid amide derivatives of azo dyestuffs which are obtained if 2 molecules of the acid chloride of the azo dyestuff resulting from the diazo component mentioned in column I and the coupling component mentioned in column II, are condensed, according to the instructions above, with 1 mol of the diamine mentioned in column III. Column IV indicates the color shade of a polyvinyl chloride sheet colored with the pigment.

|    | I | II | III | IV |
|----|---|----|-----|----|
| 4  | 4-Chloro-3-aminobenzoic acid β-methoxyethyl ester | 2,3-Hydroxynaphthoic acid | 1,4-Phenylenediamine | Red |
| 5  | " | " | 2,5-Dichloro-1,4-phenylenediamine | Scarlet |
| 6  | " | " | 2-Methyl-5-chloro-1,4-phenylenediamine | Red |
| 7  | " | " | 2,5-Dimethyl-1,4-phenylenediamine | Red |
| 8  | " | " | 2-Methoxy-1,4-phenylenediamine | Brown |
| 9  | " | " | 2-Methoxy-5-chloro-1,4-phenylenediamine | " |
| 10 | " | " | 4,4'-Diaminodiphenyl | Red |
| 11 | " | " | 3,3'-Dichloro-4,4'-diamino-diphenyl | " |
| 12 | " | " | 3,3'-Dimethyl-4,4'-diamino-diphenyl | " |
| 13 | " | " | 3,3'-Dimethoxy-4,4'-diamino-diphenyl | Brown |
| 14 | " | " | 3,3'-Dimethoxy-6,6'-dichloro-4,4'-diamino-diphenyl | Red |
| 15 | " | " | 2,5-Dimethoxy-1,4-phenylenediamine | Claret |
| 16 | " | " | 2,5-Diethoxy-1,4-phenylenediamine | " |
| 17 | 4-Chloro-3-aminobenzoic acid β-ethoxyethyl ester | " | 1,4-Phenylenediamine | Red |
| 18 | " | " | 2-Chloro-1,4-phenylenediamine | " |
| 19 | " | " | 2,5-Dichloro-1,4-phenylenediamine | " |
| 20 | " | " | 2-Methyl-5-chloro-1,4-phenylenediamine | " |
| 21 | " | " | 2,5-Dimethyl-1,4-phenylenediamine | " |
| 22 | " | " | 2,5-Diethoxy-1,4-phenylenediamine | Brown |
| 23 | " | " | 2,5-Dimethoxy-1,4-phenylenediamine | Brown |
| 24 | " | " | 4,4'Diaminodiphenyl | Red |
| 25 | " | " | 3,3'-Dichloro-4,4'-diamino-diphenyl | " |
| 26 | 4-Amino-benzoic acid β-ethoxyethyl ester | " | 2,5-Dichloro-1,4-phenylenediamine | " |
| 27 | " | " | 2,5-Dimethyl-1,4-phenylenediamine | Claret |
| 28 | 4-Chloro-3-aminobenzoic acid β-ethoxyethyl ester | 6-Bromo-2,3-hydroxy-naphthoic acid | 4,4-Diaminodiphenyl | Red |
| 29 | " | 6-Nitro-2,3-hydroxy-naphthoic acid | " | " |
| 30 | " | 6-Cyano-2,3-hydroxy-naphthoic acid | " | " |
| 31 | " | 6-Methoxy-2,3-hydroxy-naphthoic acid | " | " |
| 32 | 4-Chloro-3-aminobenzoic acid β-phenoxyethyl ester | 2,3-Hydroxynaphthoic acid | 1,4-Phenylenediamine | " |
| 33 | " | " | 2-Chloro-1,4-phenylenediamine | Scarlet |
| 34 | " | " | 2,5-Dichloro-1,4-phenylenediamine | " |

-continued

| | I | II | III | IV |
|---|---|---|---|---|
| 35 | " | " | 2,5-Dimethyl-1,4-phenylenediamine | Red |
| 36 | " | " | 2-Chloro-5-methyl-1,4-phenylenediamine | Brown |
| 37 | " | " | 2-Chloro-5-methoxy-1,4-phenylenediamine | Red |
| 38 | " | " | 2-Cyano-1,4-phenylenediamine | Scarlet |
| 39 | " | " | 2,5-Dimethoxy-1,4-phenylenediamine | Brown |
| 40 | " | " | 2-Trifluoromethyl-1,4-phenylenediamine | Red |
| 41 | " | " | 3,3'-Dichlorobenzidine | Scarlet |
| 42 | " | " | 3,3'-Dicarbomethoxybenzidine | Red |
| 43 | " | " | 2-Methoxy-1,4-phenylenediamine | Brown |
| 44 | " | " | 1,5-Diamino-naphthalene | Red |
| 45 | 4-Methoxy-3-amino-benzoic acid β-ethoxyethyl ester | " | 2,5-Dichloro-1,4-phenylenediamine | Red |
| 46 | " | " | 2,5-Dimethyl-1,4-phenylenediamine | Red |
| 47 | " | " | 2-Chloro-5-methyl-1,4-phenylenediamine | " |
| 48 | 4-Methoxy-3-aminobenzoic acid β-methoxyethyl ester | " | 2-Chloro-1,4-phenylenediamine | " |
| 49 | " | " | 2,5-Dimethoxy-1,4-phenylenediamine | Red |
| 50 | Anthranilic acid β-phenoxyethyl ester | " | 1,4-Phenylenediamine | " |
| 51 | " | " | 2-Chlorophenylenediamine | " |
| 52 | " | " | 2-Chloro-5-methyl-1,4-phenylenediamine | " |
| 53 | " | " | 2-Chloro-5-methoxy-1,4-phenylenediamine | Brown |
| 54 | " | " | 2,5-Dimethyl-1,4-phenylenediamine | " |
| 55 | " | " | 3,3'-Dichlorobenzidine | Red |
| 56 | " | " | 3,3'-Dimethylbenzidine | " |
| 57 | " | " | 3,3'-Dimethoxybenzidine | Brown |
| 58 | Anthranilic acid β-4'-chlorophenoxyethyl ester | " | 1,4-Phenylenediamine | " |
| 59 | " | " | 2-Chloro-1,4-phenylenediamine | " |
| 60 | " | " | 2-Methyl-1,4-phenylenediamine | Brown |
| 61 | " | " | 2,5-Dichloro-1,4-phenylenediamine | Red |
| 62 | " | " | 2-Chloro-5-methyl-1,4-phenylenediamine | " |
| 63 | " | " | 2-Chloro-5-methoxy-1,4-phenylenediamine | " |
| 64 | " | " | 2,5-Dimethyl-1,4-phenylenediamine | Brown |
| 65 | " | " | 2,5-Dimethoxy-1,4-phenylenediamine | " |
| 66 | " | " | 1,5-Naphthylenediamine | Red |
| 67 | Anthranilic acid β-4'-methylphenoxyethyl ester | " | 1,4-Phenylenediamine | " |
| 68 | " | " | 2-Chloro-5-methyl-1,4-phenylenediamine | Brown |
| 69 | " | " | 2-Chloro-5-methoxy-1,4-phenylenediamine | Red |
| 70 | " | " | 2,5-Dimethyl-1,4-phenylenediamine | Brown |
| 71 | Anthranilic acid β-2'-chlorophenoxyethyl ester | " | 1,4-Phenylenediamine | Red |
| 72 | " | " | 2-Chloro-1,4-phenylenediamine | " |
| 73 | " | " | 2-Methyl-1,4-phenylenediamine | Brown |
| 74 | " | " | 2,5-Dichloro-1,4-phenylenediamine | Scarlet |
| 75 | " | " | 2-Chloro-5-methyl-1,4-phenylenediamine | Brown |
| 76 | " | " | 2-Chloro-5-methoxy-1,4-phenylenediamine | " |
| 77 | " | " | 2,5-Dimethyl-1,4-phenylenediamine | " |
| 78 | " | " | 2,5-Dimethoxy-1,4-phenylenediamine | " |
| 79 | Anthranilic acid β-4'-methoxyphenoxyethyl ester | " | 1,4-Phenylenediamine | Red |
| 80 | " | " | 2-Methoxy-1,4-phenylenediamine | Brown |
| 81 | 4,6-Dichloro-3-aminobenzoic acid β-phenoxyethyl ester | " | 1,4-Phenylenediamine | Red |
| 82 | 4-Phenoxy-3-aminobenzoic acid β-phenoxyethyl ester | " | 1,4-Phenylenediamine | " |
| 83 | 4-Chloro-1-aminobenzene-2-carboxylic acid β-phenoxyethyl ester | " | 1,4-Phenylenediamine | " |
| 84 | 4-Chloro-3-aminobenzoic | " | 1,3-Phenylenediamine | Red |

-continued

| | I | II | III | IV |
|---|---|---|---|---|
| | acid β-ethoxyethyl ester | | | |
| 85 | " | " | 3-Chloro-1,3-phenylenediamine | " |
| 86 | 4-Methyl-3-aminobenzoic acid β-phenoxyethyl ester | " | 1,4-Phenylenediamine | Red |
| 87 | " | " | 2,5-Dimethyl-1,4-phenylenediamine | Red |
| 88 | 4-Methyl-3-aminobenzoic acid β-ethoxyethyl ester | " | 1,4-Phenylenediamine | Red |
| 89 | " | " | 2-Chloro-1,4-phenylenediamine | Red |
| 90 | " | " | 2,5-Dichloro-1,4-phenylenediamine | Red |
| 91 | " | " | 2-Methoxy-1,4-phenylenediamine | Red |
| 92 | " | " | 2,5-Dimethyl-1,4-phenylenediamine | Red |
| 93 | " | " | 2,5-Dimethoxy-1,4-phenylenediamine | Claret |
| 94 | 4-(4'-Chlorophenoxy)-3-aminobenzoic acid β-ethoxyethyl ester | " | 2,5-Dimethyl-1,4-phenylenediamine | Red |
| 95 | 4-Chloro-3-aminobenzoic acid β-propoxyethyl ester | " | 1,4-Phenylenediamine | Red |
| 96 | " | " | 2-Chloro-1,4-phenylenediamine | Red |
| 97 | 4-Chloro-3-aminobenzoic acid β-isopropoxyethyl ester | " | 2,5-Dimethyl-1,4-phenylenediamine | Red |
| 98 | 4-Chloro-3-aminobenzoic acid β-(4'-chlorophenoxy)-ethyl ester | " | " | Red |
| 99 | " | " | 1,4-Phenylenediamine | Red |
| 100 | 4-Chloro-3-aminobenzoic acid β-ethoxyethyl ester | " | 2,6-Diamino-diphenylene oxide | Brown |
| 101 | " | " | 4,4'-Diamino-diphenyl ether | Scarlet |
| 102 | " | " | 4,4'-Diamino-azobenzene | Brown |
| 103 | " | " | 4,4'-Diamino-diphenyl-methane | Red |
| 104 | " | " | 4-Chloro-1,3-diaminobenzene | Red |
| 105 | " | " | 4-Methyl-1,3-diaminobenzene | Red |

EXAMPLE 106

5.0 parts of 4-chloro-3-aminobenzoic acid β-ethoxyethyl ester in 100 parts of glacial acetic acid/water 1:1 and 7 parts by volume of 30% strength hydrochloric acid are warmed to 50° C and cooled. Diazotisation is carried out in the customary manner with 5.3 parts by volume of 4 N sodium nitrite solution at 0°–2° C and the mixture is filtered. 3.0 parts of borax in aqueous solution are mixed with the diazo solution at 0°–5° C.

Separately, 5.15 parts of bis(2'-hydroxynaphthalene-3'-carboxylic acid) 2-chloro-5-methoxyphenyl-1,4-diamide are dissolved in 50 parts of ethylene glycol monomethyl ether, 100 parts of water and 3 parts by volume of 30% strength sodium hydroxide solution and the mixture is filtered. The diazo and coupling components are brought to the same volumes, if necessary, by dilution with water.

The two solutions are fed continuously to a mixing jet, whereupon an immediate coupling of the components takes place at 15°–20° C and a $p_H$ value of 8.5–9.0. The resulting pigment suspension is filtered and the filter residue is washed free from salt with hot water. The moist pigment cake is azeotropically freed from water by means of 150 parts by volume of nitrobenzene, while stirring, and is subsequently stirred for 2 hours at 180°–185° C. After cooling to 100° C, the mixture is filtered and the filter residue is washed, first with hot nitrobenzene and then with cold methanol, and is dried at 40°–50° C in vacuo. The resulting pigment colors plastics, such as polyvinyl chloride, and lacquers in red color shades of good fastness to migration, over-varnishing and light and has the following structural formula:

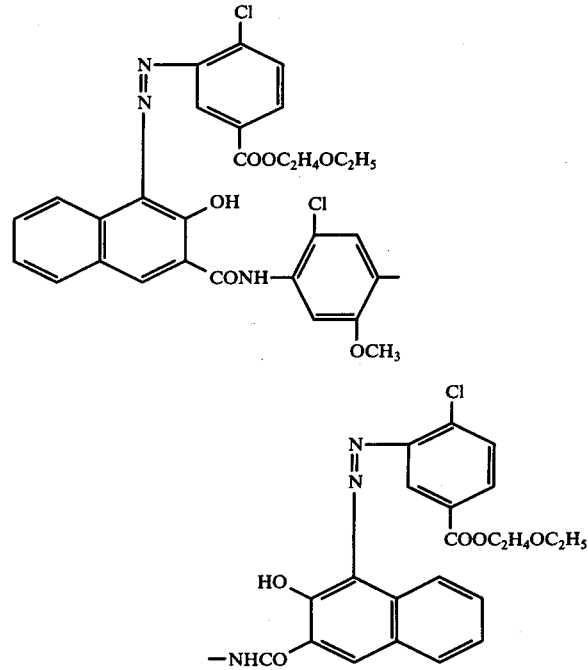

EXAMPLE 107

7.5 parts of the diazoamino compound of the formula

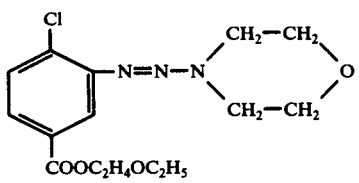

together with 5.17 parts of 2,5-dichloro-1,4-bis-(2'-hydroxy-3'-naphthoylamino)-benzene, are stirred in 300 parts of o-dichlorobenzene and 5 parts of acetic acid and the mixture is slowly heated to 130°–135° C. It is stirred for 6 hours at this temperature and the dyestuff formed is then filtered off with suction and washed with hot o-dichlorobenzene, then with cold methanol and finally with water. After drying in vacuo at 90° to 100° C, a soft-grained, red pigment is obtained, which colors polyvinyl chloride in red color shades, fast to migration and light. The pigment has the following structural formula:

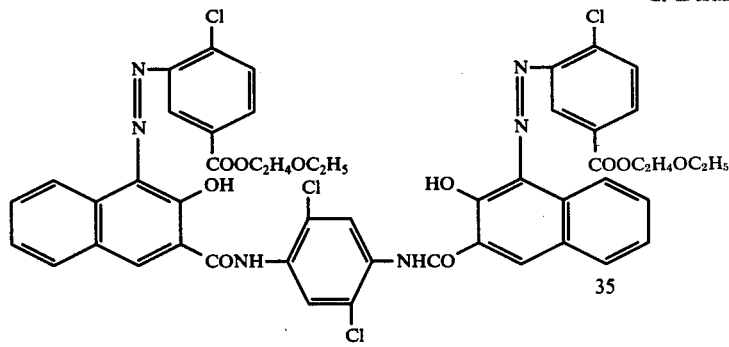

EXAMPLE 108

65 parts of stabilized polyvinyl chloride, 35 parts of dioctyl phthalate and 0.2 part of dyestuff obtained in accordance with Example 1 are stirred with one another and are then milled on a twin-roll calendar for 7 minutes at 140° C. A red-colored sheet of very good fastness to light and migration is obtained.

EXAMPLE 109

10 g of titanium dioxide and 2 g of the pigment prepared according to Example 1 are ground for 48 hours in a ball mill with 88 g of a mixture of 26.4 g of coconut alkyd resin, 24.0 g of melamine-formaldehyde resin (50% solids content), 8.8 g of ethylene glycol monomethyl ether and 28.8 g of xylene.

If this lacquer is sprayed onto an aluminium foil, pre-dried at room temperature for 30 minutes and then stoved at 120° C for 30 minutes, a red lacquering is obtained which has a good depth of color and is distinguished by very good fastness to over-varnishing, light and weathering.

What we claim is:

1. Disazo pigment of the formula

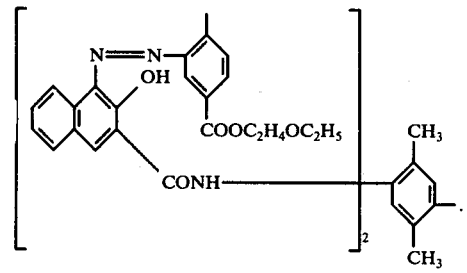

* * * * *

UNITED STATES PATENT AND TRADEMARK OFFICE
CERTIFICATE OF CORRECTION

PATENT NO. : 4,053,464  
DATED : OCTOBER 11, 1977  
INVENTOR(S) : ARMAND ROUECHE

Page 1 of 2

It is certified that error appears in the above—identified patent and that said Letters Patent is hereby corrected as shown below:

Claim 1, Column 18, lines 40-45 reads:

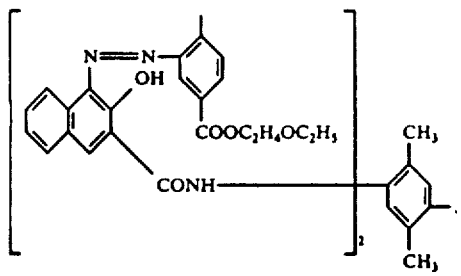

UNITED STATES PATENT AND TRADEMARK OFFICE
CERTIFICATE OF CORRECTION

PATENT NO. : 4,053,464
DATED : OCTOBER 11, 1977
INVENTOR(S) : ARMAND ROUECHE

It is certified that error appears in the above—identified patent and that said Letters Patent is hereby corrected as shown below:

Claim 1, Column 18, lines 40-45 should read:

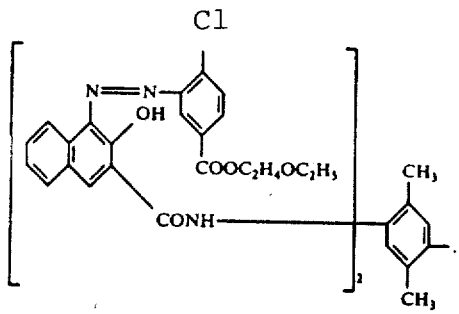

Signed and Sealed this

First Day of June 1982

[SEAL]

Attest:

Attesting Officer

GERALD J. MOSSINGHOFF
Commissioner of Patents and Trademarks